3,070,548
REMOVAL OF POLYMERIZED MATERIALS
FROM SURFACES
Jesse M. Brooke, Sweeny, Tex., assignor to Phillips Petroleum Company, a corporation of Delaware
No Drawing. Filed Oct. 10, 1958, Ser. No. 766,377
4 Claims. (Cl. 252—172)

This invention relates to a novel composition and method for the removal of polymeric materials from processing equipment, such as fractionation columns, heat exchangers, and the like, utilized especially for processing petroleum products in petroleum refining processes. This invention relates more particularly to the cleaning of heat exchange surfaces having polymeric materials deposited thereon comprising the treatment of said surfaces with a mixture of a hydrocarbon, such as kerosene and methylene dichloride.

Fractional and extractive distillations of easily polymerizable substances, such as the lower diolefin hydrocarbons and vinyl compounds, are usually beset with complications due to polymer formation interfering with processing. The polymers formed ordinarily vary according to the material and the polymerization conditions. In general, however, the polymers formed vary in character from being soft, tacky and rubber-like to hard masses which are brittle enough to be pulverized. It is well recognized that polymer formation is not only objectionable from the standpoint of deterioration of valuable materials but also by reason of the polymer accumulation in heat exchange and other equipment parts which, if allowed to accumulate, often cause complete shutdown of the processing equipment. The removal of such contaminating polymeric materials from processing equipment suitable for continuous use is, therefore, desirable and particularly important. The present invention is a development in this field.

The deposit of polymeric materials on heat exchanger surfaces is highly disadvantageous in refinery processing. The deposition of the polymeric materials acts as an insulating agent and thus considerably reduces the efficiency of the heat exchanger. Further, once the polymer is formed on the surface, polymer apparently serves as an absorbent for further quantities of polymer and thus causes a very rapid increase in polymer formation. Therefore, the removal of the deposited materials as soon after formation as conveniently possible is highly desirable. The present invention is directed to a simple and effective means for cleaning heat exchanger surfaces, distillation towers, etc. and petroleum refinery equipment without the necessity of dismantling or the undertaking of any appreciable mechanical work.

Therefore, it is an object of this invention to provide a novel composition particularly adapted for the removal of polymeric materials deposited on the surfaces of processing equipment.

It is another object of this invention to provide a novel composition particularly adapted to cause sloughing-off of polymeric materials deposited on the surfaces of processing equipment.

It is still another object of this invention to provide a method for readily removing polymeric deposits from the surfaces of processing equipment.

It is a further object of this invention to provide a simple and effective method for the removal of polymeric materials from heat exchange surfaces, distillation towers and the like.

It is a further object of this invention to provide a method and composition for removal of polymer deposits of polymers of cyclopentadiene, butadiene, and the like from heat exchange surfaces, distillation towers, and the like.

Other aspects, objects, as well as the several advantages of this invention are apparent from a study of the disclosure and the appended claims.

In accordance with the present invention, I provide a novel composition particularly adapted for the removal of polymeric materials from the surfaces of processing equipment, such as heat exchangers, distillation towers, and the like, comprising a mixture of a hydrocarbon, such as kerosene, and methylene dichloride, not to dissolve the deposited polymer but to cause the polymeric deposit to slough-off the fouled surface so that the deposit can readily be removed by mechanical treatment or means.

Also, in accordance with the present invention, I provide a simple and effective method for cleaning polymeric deposits from metallic, ceramic and other surfaces in various pieces of processing equipment, such as heat exchangers, distillation columns, and the like, utilized, for example, in petroleum refining processes, comprising contacting said surface with a composition comprising a mixture of a hydrocarbon, such as kerosene, and methylene dichloride to cause the polymer to slough-off the surface so that the deposit can be readily removed, and mechanically treating said surface to remove said polymeric deposits.

As stated above, the novel composition of the present invention does not appear to actually dissolve the polymer to a great extent, but rather unexpectedly causes the polymeric deposit to slough-off of the surfaces of the processing equipment so that the polymer can then be easily removed from the surface by mechanical treatment or means. Further, I have unexpectedly found that methylene dichloride specifically diluted in a light hydrocarbon oil fraction, such as kerosene, is very effective in cleaning polymeric material, resulting from cyclopentadiene, butadiene and the like, from the surfaces of the processing equipment, especially heat exchange surfaces.

The amount of methylene dichloride to be added to the light hydrocarbon oil or kerosene should be at least about 10 percent of the total hydrocarbon oil volume, but will, of course, depend upon the temperature at which it is to be used, the length of time for which it is to be used, etc. I have found that methylene dichloride specifically diluted in kerosene at 50–50 volume percent was very effective in cleaning polymerized cyclopentadiene polymers from the surfaces of heat exchange equipment. The boiling range of the light hydrocarbon oil, such as kerosene, utilized as a diluent in the present invention will generally range from about 200 to 575° F., preferably 350 to 525° F.

The novel composition of the present invention can be utilized in several ways for cleaning the surfaces of the processing equipment, especially petroleum refinery heat exchange surfaces. For example, the cleaning composition can be continuously added to the method or system which may have deposits of polymeric materials to cause sloughing-off of the polymeric materials as they are formed and thereby preventing an appreciable deposition of polymer. However, in some refinery methods, the presence of organic chlorides in the products is undesirable and, therefore, a batch method may be more advantageous. Therefore, in a batch treatment, the equipment having polymeric deposition problems can be disconnected from the remaining associated processing equipment and the composition of the present invention circulated through the disconnected equipment.

The methylene dichloride-kerosene cleaning composition of the present invention can be applied to the surface to be treated wholly in liquid phase as, for example, by passing a body of the liquid over the surface for a certain period of time and at a desired temperature. Alternatively, if desired, methylene dichloride-kerosene composition may be utilized partly in the liquid and partly in the vapor form by evaporating the composition either in an external vessel or within the structure to be cleaned and then permitting the vapors to be condensed on the surfaces of the vessel. The temperature utilized for the treatment of the surfaces fouled with polymeric materials will generally be determined by the nature of the diluent employed, especially its boiling range, and by the resistance of the deposit to the resolution, however, in general, the temperature of contacting will ordinarily range from 70 to 450° F.

In one form of the invention as applied to the cleaning of reboiler equipment utilized in the depropanizing step of the purification processing in an ethylene manufacturing plant, the preferred method consisted in disconnecting the reboiler feed line and washing the surfaces of the reboiler with methylene dichloride diluted in kerosene. The methylene dichloride-kerosene solution which may contain some polymeric material which has been loosened from the surfaces of the reboiler can be passed to a recovery unit, such as a filter to remove polymeric deposits carried with the methylene dichloride-kerosene solution. The methylene dichloride-kerosene solution can then be recycled through the heat exchanger again. As pointed out above, the methylene dichloride-kerosene solution does not appear to actually dissolve the polymer deposits on the surfaces of the equipment being treated to a great extent, but rather unexpectedly causes the polymer to slough-off of the surface so that the polymer can then be easily removed from the surface by mechanical treatment or means.

*Example*

A 50–50 volume percent mixture of kerosene having a boiling range of 350–525° F. and methylene dichloride was used for the removal of cyclopentadiene polymer from the surfaces of the depropanizer reboilers of an ethylene manufacturing plant. The reboiler was removed from service and the 50–50 volume percent kerosene-methylene dichloride solution was passed through the reboiler at a temperature of about 180° F. for 2 hours. It was found after completion of the treatment that the polymer deposits on the reboiler surfaces had sloughed-off of the surfaces to the extent that the polymer could be easily removed from the metal surfaces by mechanical means without the usual scraping and chipping.

As previously indicated, I have provided a method and novel composition for the removal of polymer contamination from petroleum refining equipment wherein the treating composition causes the polymer contamination to slough-off the equipment surfaces rather than removal by dissolution of the polymer contamination by the novel composition. The invention has its main field of application in the processing of hydrocarbon fractions wherein light hydrocarbons are separated from complex hydrocarbon mixtures and, wherein polymer deposition primarily in a residual portion of the mixture takes place in the processing equipment, especially in the heat exchangers. In the processing of complex hydrocarbon mixtures, diolefins, for example, present in the mixture are subjected to prolonged heating and consequently undergo polymerization to form polymer complexes which precipitate out of the mixture, especially at the constricted parts of the equipment, and on the heat exchange surfaces, especially on which polymer deposition is accelerated. As stated before, the deposition of such polymers tends to reduce the heat efficiency and to plug the equipment at the constricted parts.

As illustrated by the specific example above, the method and composition of the present invention were especially effective in the removal of cyclopentadiene polymer contamination of the heat exchange surfaces of a depropanizer tower reboiler used for the separation of light hydrocarbons in an ethylene manufacturing plant. Similarly, the invention can be utilized advantageously in other processes where other polymer contamination, for example, butadiene polymer, fouls processing equipment, such as in the separation and purification of $C_4$ and $C_5$ diolefins from petroleum distillate. Although the present invention has been described in connection with specific applications thereof, it is not intended that applications should be limited thereby.

Reasonable variation and modification are possible within the scope of the foregoing disclosure and the appended claims to the invention, the essence of which is a composition adapted to readily remove polymeric deposits from processing equipment surfaces comprising a mixture of methylene dichloride and kerosene and a method for cleaning polymeric deposits from the surfaces of processing equipment comprising contacting said surfaces with a composition comprising a mixture of methylene dichloride and kerosene to cause the polymer to slough-off the surfaces so it can be easily removed therefrom, and mechanically treating said surfaces to remove said polymeric material.

I claim:

1. A method for removing from process equipment butadiene and cyclopentadiene polymeric deposits which comprises contacting said deposits with a mixture consisting of from 10 to 50 volume percent of methylene dichloride and the remainder a light hydrocarbon oil having a boiling range from 350 to 525° F. until said deposit sloughs-off the surfaces of said equipment, and removing said sloughed-off deposits from said equipment.

2. A method for removing from the surfaces of processing equipment cyclopentadiene and butadiene polymeric deposits which comprises contacting said surfaces with a 50–50 volume percent mixture of methylene dichloride and kerosene until said deposits slough-off said surfaces of said equipment, and mechanically removing said sloughed-off deposits from said equipment.

3. A method for removing cyclopentadiene and butadiene polymer deposits from petroleum refinery distillation equipment employed in the distillation of easily polymerizable hydrocarbons which comprises interrupting periodically the distillation of the said easily polymerizable hydrocarbon being carried out in said equipment, then passing through said equipment a mixture consisting essentially of kerosene and from 10 to 50 volume percent of methylene dichloride until said polymer contamination sloughs-off the surfaces of said equipment, and removing said sloughed-off polymer from said equipment.

4. A method for removing cyclopentadiene and butadiene polymer contamination from petroleum refinery distillation equipment employed in the purification of olefin-containing hydrocarbon fractions which comprises interrupting periodically the distillation of the said hydrocarbon fraction being carried out in said distillation equipment, then passing through said equipment a 50–50 volume percent mixture of kerosene and methylene dichloride at a temperature of about 180° F. until said polymer sloughs-off the surfaces of said equipment, discontinuing the treatment of said surfaces with said mixture, and mechanically removing said sloughed-off polymer from said equipment.

References Cited in the file of this patent

UNITED STATES PATENTS

| 2,482,904 | Dougherty et al. | Sept. 27, 1949 |
| 2,541,703 | K'Burg | Feb. 13, 1951 |
| 2,748,084 | Lew et al. | May 29, 1956 |
| 2,749,313 | Williams et al. | June 5, 1956 |

FOREIGN PATENTS

| 243,030 | Great Britain | Apr. 19, 1927 |

OTHER REFERENCES

Berkeley et al.: "Soap and Chemical Specialties," September 1955, pp. 166–169 and 213.